Dec. 18, 1962 D. J. D. HOCKENHULL 3,069,328
PRODUCTION OF GRISEOFULVIN
Filed May 3, 1961
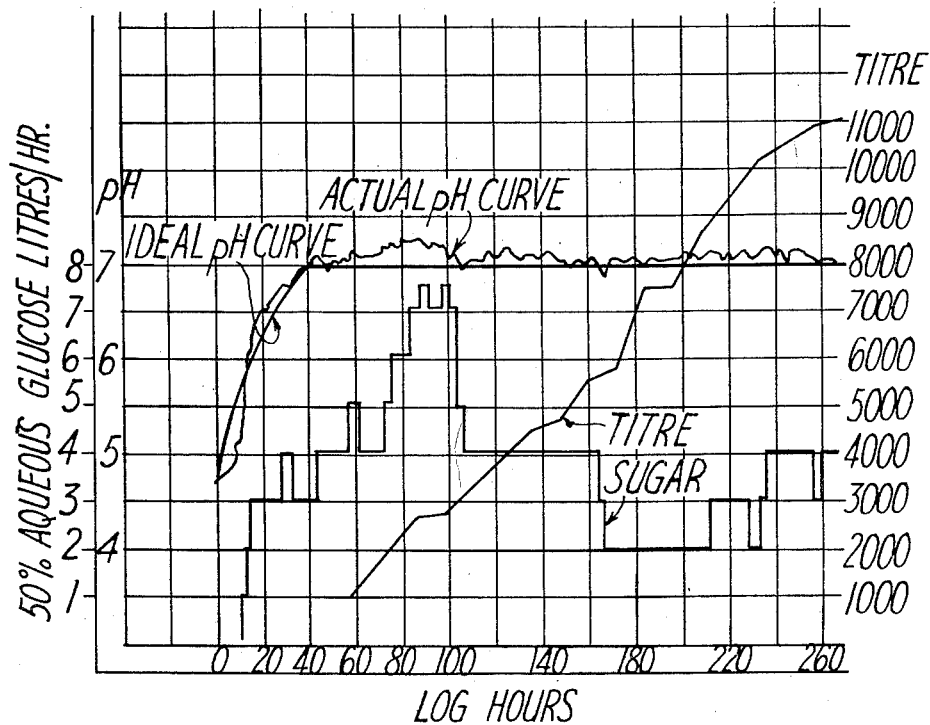
Inventor
DONALD JOHN DARLINGTON HOCKENHULL
By Bacon & Thomas
Attorneys 3,069,328
PRODUCTION OF GRISEOFULVIN
Donald J. D. Hockenhull, Ulverston, England, assignor to Glaxo Laboratories Limited, Greenford, England, a British company
Filed May 3, 1961, Ser. No. 107,363
Claims priority, application Great Britain May 4, 1960
10 Claims. (Cl. 195—81)

This invention is concerned with improvements in or relating to the production of the antibiotic griseofulvin.

Griseofulvin, which is an important antifungal antibiotic, is produced by the culture of various species of the genus Penicillium and in British Patent No. 784,618 are described methods of conducting such cultures under submerged aerobic conditions more suited to commercial production than the previously described surface culture technique. As stated in the said specification, various factors are important in the submerged culture of griseofulvin-producing organisms if reasonable yields are to be obtained, the chief of which is the level of nitrogen in the culture medium; it is also stated that the level of carbohydrate is important and that this should be somewhat higher than might be expected.

In application No. 10,586, filed February 24, 1960, now U.S. Patent No. 3,038,839, we have described a process for the production of griseofulvin by submerged aerobic culture a nutrient carbohydrate serving to supply carbon and energy requirements of the organism, such additions of carbohydrate being in such quantities and at such times that the pH of the medium follows a controlled pH curve as defined in the said specification. In that process preferably the pH of the medium is maintained between 6.6 and 7.6 during the bulk of the fermentation by repeated controlled additions of nutrient carbohydrate.

In specification No. 784,618 it is stated that for the production of griseofulvin under submerged aerobic culture, the medium should contain an assimilable source of nitrogen at a level of from 0.04% to 0.30% of N. Experiments have indeed shown in many trial fermentations that the use of nitrogen levels both above and below this range results in a fall off of titre.

We have now found, however, that under certain conditions hereinafter referred to, it is posible to use increased levels of nitrogen above the maximum 0.3% N referred to in specification No. 784,618, in general without substantial diminution of titre, and indeed in general with beneficial results on productivity.

By means of the present invention we are able to use nitrogen levels in the medium up to 0.45% N, and in some instances 0.5% N.

In principle to enable griseofulvin to be produced by submerged aerobic culture in a medium containing an assimilable source of nitrogen in an amount in excess of 0.3% N, we have found that the culture should be conducted in accordance with the process described in copending application No. 10,586, i.e. by initiating the culture at a pH of less than 6.6 in a medium poor in nutrient carbohydrate, allowing the culture to proceed until the pH is in the range of between about 6.6 and 7.6 and thereafter repeatedly adding (continuously or batchwise) to the culture a nutrient carbohydrate serving to supply carbon and energy requirements of the organism, such additions of carbohydrate being in such quantities and at such times that the pH of the medium follows a controlled pH curve.

As explained in said application No. 10,586 it is possible to produce experimentally for any fermentation an ideal pH curve, which the fermentation should follow for optimal results under given conditions; the expression "controlled pH curve" is used herein in the same sense as it is used in said application No. 10,586 to designate a pH curve which is closer in shape to the ideal pH curve than to the pH curve of a fermentation conducted under the same conditions but without any pH control.

According to the invention therefore we provide a process for the production of griseofulvin by the submerged aerobic culture of a griseofulvin-producing organism in a nutrient therefor in which said medium contains assimilable nitrogen at a level of more than 0.3% (calculated as N) and in which a nutrient carbohydrate serving to supply carbon and energy requirements of the organism is repeatedly added to the medium during the course of the culture in such quantities and at such times that the pH of the medium follows a controlled pH curve as herein defined.

In general it is desirable that the frequency and quantity of the carbohydrate additions should be such that the pH of the medium lies between 6.6 and 7.6, and preferably 6.8 and 7.2 for the greater part of the fermentation. Indeed, it is advantageous that the pH curve should conform substantially to a straight line for a substantial part of the fermentation. The carbohydrate can be added batchwise from time to time or may be added in continuous manner at such a rate that the pH of the medium follows the desired controlled pH curve.

The preferred carbohydrate for use according to the invention is glucose it being noted that glucose is the preferred carbohydrate for use in the process described in said specification No. 784,618. Other carbohydrates which can be used include sucrose, hydrolysed starch, invert sugar, cane molasses and invert molasses. Lactose and starch can also be used but with less advantage.

It is also advantageous to include in the medium an assimilable source of sulphur, for which purpose sulphates, thiosulphates, sulphites etc. may be used; preferred substances are the alkali metal e.g. sodium and potassium sulphates and thiosulphates. Sulphuric acid itself may also be used. Conveniently the sulphur source may be included at a level between 0.01% and 0.05% (as S), preferably 0.02–0.04% S.

It is further advantageous to employ a level of assimilable phosphate between 0.4% and 0.8% and a level of assimilable chloride of at least 0.2 and preferably 0.3%; the level of chloride should be sufficient to provide the whole of the chlorine for the anticipated yield to griseofulvin. The phosphate may be any water-soluble phosphate, conveniently of an alkali metal; sodium or potassium dihydrogen phosphate being, for example satisfactory. The chloride is conveniently added as sodium or potassium chloride.

Suitable sources of assimilable nitrogen for use in the process according to the invention are the nitrogenous complex organic materials of the type commonly used in fermentation procedures, examples of which are corn steep liquor, cottonseed meal, oatmeal, distillers solubles, soya bean meal, nitrogenous milk products such as whey powder, butter milk etc. In general we find that corn steep liquor is the preferred basal source of assimilable nitrogen, although particularly advantageous results are obtained by using a mixture of corn steep liquor and distillers solubles. Mixtures wherein the ratio on a nitrogen basis of corn steep liquor to distillers solubles is between 1:4 and 4:1 are satisfactory, mixtures of equal proportions on a nitrogen basis being particularly advantageous.

When employing increased nitrogen levels above 0.3% it is also helpful to supply part of the nitrogen requirements by means of simple, readily assimilable sources of nitrogen as described in copending application No. 107,369, filed May 3, 1961 of even date herewith, for which purpose ammonium salts, especially ammonium sulphate are preferred.

It is also advantageous to have present a methyl donor as described in copending application No. 103,213, filed April 17, 1961, a suitable substance being choline.

Various griseofulvin producing species of the genus Penicillium may be used in the process according to the present invention, and in particular those referred to in Patent No. 784,618. The preferred organism is, however, *Penicillium patulus* C.M.I. 39,809: NRRL 989. Apart from the conditions referred to herein, the fermentation is conveniently carried out in accordance with general fermentation practice. Thus the organism is preferably introduced into the production medium as a vegetative inoculum, some 7.5–10% of inoculum being preferably used. The rate of stirring and the rate of aeration in the medium for optimum results vary according to the shape of the fermentation vessel used, and must be determined for the particular vessel in question. Generally it is desirable to initiate the fermentation at relatively low rates of airflow, which are gradually increased as the fermentation proceeds. Antifoam agents e.g. of the white mineral oil type may be used to control undue foaming action in the medium.

For the better understanding of the invention, the following examples are given by way of illustration only:

*Example 1*

The following medium was batched:

| | Percent |
|---|---|
| Corn steep liquor nitrogen | 0.34 w./v. |
| $KH_2PO_4$ | 0.4 w./v. |
| KCl | 0.2 w./v. |
| $CaCO_3$ | 0.4 w./v. |
| Mobilpar S | 0.0275 v./v. |
| White mineral oil | 0.0275 v./v. |
| $H_2SO_4$ | 0.20 v./v. |
| Pre-inoculation volume | 500 gal. |
| Fermentation temperature | 25°. |
| Inoculum volume | 10. |
| Strain: *P. Patulum* | GA 766. |

The experiment was carried out in a 600 gal. tank containing 3 x 1′6″ impellers rotating at 165 r.p.m. The airflow was 25 c.f.m. for the first 5 hrs., 50 c.f.m. from 5–10 hrs. and 80 c.f.m. from then on. The pH was allowed to rise to about 7.0 and thereafter controlled as near 7.0 as possible by repeated glucose addition. Strain GA 766 was used. The inoculum was developed on the development medium of Example 2 and the transfer time was according to the same criteria of age or growth.

| CSL, N Percent | g./l. griseofulvin/hr. | | | | | |
|---|---|---|---|---|---|---|
| | 100 | 150 | 200 | 250 | 300 | 350 |
| Experiment | 0.34 | 1.2 | 2.2 | 3.7 | 5.6 | 6.5 | 6.5 |
| Control | 0.25 | 1.8 | 2.9 | 4.2 | 5.4 | 5.2 | 5.9 |

The control medium differed from the experimental medium only in its nitrogen content.

*Example 2*

Medium:

| | Percent |
|---|---|
| Corn steep liquor nitrogen | 0.40 w./v. |
| $KH_2PO_4$ | 0.40 w./v. |
| $CaCO_3$ | 0.40 w./v. |
| KCl | 0.20 w./v. |
| Mobilpar S | 0.0275 v./v. |
| White mineral oil | 0.0275 v./v. |
| $H_2SO_4$ | 0.0125 v./v. |
| Pre-inoculation volume | 800 gal. |
| Fermentation temperature | 25° C. |
| Inoculum volume | 10. |

The experiment was carried out on the 1,000 gal. scale. 3 impellers 1′8″ diameter at 220 r.p.m. were employed. The air rates were 0–5 hr. 40 c.f.m., 5–10 hrs. 80 c.f.m. and after 10 hrs. 125 c.f.m. The inoculum rate was 10% v./v.

It was prepared by the standard inoculum development technique on the following medium:

| | Percent |
|---|---|
| Corn steep liquor nitrogen | 0.30 w./v. |
| Brown sugar | 2.0 w./v. |
| Chalk | 1.0 w./v. |
| Maize oil | 1.0 v./v. |
| Hodag MF | 0.033 v./v. |

This was inoculated with a spore suspension of *P. patulum* (1 litre containing $3–5 \times 10^7$ spores/ml.) and grown at 25° in 100 gal. tank. The inoculum is transferred at 40 hr. or when the mycelial volume (after spinning 10 min. at 3000 r.p.m.) exceeds 25%.

The fermentation is conducted as near to the ideal pH curve as possible by addition of crude glucose. The accompanying drawing shows the ideal pH curve as well as the actual pH curve and rate of glucose addition.

The yields of griseofulvin by this treatment are as follows as compared with a lower nitrogen experiment.

| CSL, N Percent | g./l. griseofulvin at hr. | | | | |
|---|---|---|---|---|---|
| | 100 | 150 | 200 | 250 |
| Experiment | 0.40 | 2.8 | 4.8 | 8.0 | 10.6 |
| "Control" | 0.25 | 2.4 | 4.0 | 5.7 | 6.7 |

The control medium differed from the experimental medium only in its nitrogen content.

*Example 3*

In this example 800 imperial gallons of the following medium was used:

| | Percent |
|---|---|
| Corn steep liquor to give nitrogen | 0.30 w./v. |
| Ammonium sulphate to give nitrogen | 0.05 w./v. |
| Light precipitated chalk | 0.40 w./v. |
| $KH_2PO_4$ | 0.40 w./v. |
| KCl | 0.10 w./v. |
| Proprietary antifoam oils | 0.028 v./v. |
| Conc. $H_2SO_4$ | 0.001 v./v. |

Sterilisation: 15 min. at 121° C. Preinoculation; volume 800 gal.: pH 4.8. Inoculum: 10% vegetative: strain C3/5.

The pH was allowed to rise to about 7.0 and thereafter controlled as near 7.0 as possible by repeated addition of 50% w./v. solution of can molasses.

The results were as follows:

| Time, hrs.: | Griseofulvin yield, g./l. |
|---|---|
| 50 | 0.6 |
| 100 | 1.7 |
| 150 | 3.8 |
| 200 | 5.2 |
| 250 | 7.7 |
| 300 | 10.7 |
| 350 | 12.3 |
| 380 | 15.4 |

I claim:

1. A process for the production of griseofulvin by the submerged aerobic culture of a griseofulvin-producing organism comprising initiating the culture at a pH less than 6.6 in a medium poor in nutrient carbohydrate, allowing the culture to proceed until the pH is in the range of between about 6.6 and 7.6 and thereafter repeatedly adding nutrient carbohydrate to the medium in such quantities and at such times that the pH remains within said range of between about 6.6 and 7.6, said medium being provided with assimilable nitrogen at a level of more than 0.3%.

2. A process as claimed in claim 1 wherein said range within which the pH is controlled is between about 6.8 and 7.2.

3. A process as claimed in claim 1 wherein said pH is allowed to increase until a pH of about 7.0 is reached and thereafter said pH is controlled so as to remain at about 7.0.

4. A process as claimed in claim 1 in which the nutrient carbohydrate employed is selected from the group consisting of glucose, sucrose, hydrolyzed starch, invert sugar, cane molasses and invert molasses.

5. A process as claimed in claim 1 in which the organism employed is *Penicillium patulum* C.M.I. 39,809.

6. A process as claimed in claim 1 in which the medium contains as a source of nitrogen at least one member selected from the group consisting of corn steep liquor, cottonseed meal, oatmeal, distillers solubles, soya bean meal and nitrogenous milk product.

7. A process as claimed in claim 1 in which the medium includes from 0.4–0.8% of an assimilable phosphate.

8. A process as claimed in claim 7 in which the nutrient medium includes at least 0.3% of assimilable chloride.

9. A process as claimed in claim 1 in which the medium contains an assimilable source of sulphur.

10. A process for the production of griseofulvin by the submerged aerobic culture of a griseofulvin-producing organism comprising initiating the culture at a pH less than 6.6 in a medium poor in nutrient carbohydrate, allowing the culture to proceed until the pH is in the range of between about 6.6 and 7.6 and thereafter repeatedly adding nutrient carbohydrate to the medium in such quantities and at such times that the pH remains between 6.6 and 7.6, said medium being provided with assimilable nitrogen at a level between about 0.3% and 0.5%.

References Cited in the file of this patent

UNITED STATES PATENTS 2,843,527     Rhodes et al. _____ July 15, 1958